(12) United States Patent
Nickolaou

(10) Patent No.: US 9,891,628 B2
(45) Date of Patent: Feb. 13, 2018

(54) SENSOR-BASED ASSOCIATION OF TRAFFIC CONTROL DEVICES TO TRAFFIC LANES FOR AUTONOMOUS VEHICLE NAVIGATION

(71) Applicant: GM Global Technology Operations LLC, Detroit, MI (US)

(72) Inventor: James N. Nickolaou, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/173,914

(22) Filed: Jun. 6, 2016

(65) Prior Publication Data
US 2017/0351266 A1    Dec. 7, 2017

(51) Int. Cl.
G05D 1/02        (2006.01)
G05D 1/00        (2006.01)

(52) U.S. Cl.
CPC ......... *G05D 1/0274* (2013.01); *G05D 1/0088* (2013.01)

(58) Field of Classification Search
None
See application file for complete search history.

(56) References Cited

U.S. PATENT DOCUMENTS

2008/0162027 A1* 7/2008 Murphy ............... B60W 50/14
                                                         701/117
2012/0083960 A1* 4/2012 Zhu ..................... G05D 1/0055
                                                         701/23

* cited by examiner

*Primary Examiner* — Rodney Butler
*Assistant Examiner* — Tamara Weber

(57) ABSTRACT

A system for generating mapping data includes a host vehicle and at least one sensor coupled to the host vehicle. The sensor is capable of detecting a traffic control device and capable of detecting motion of a vehicle. The system additionally includes non-transient data storage and a processor. The processor is in communication with the sensor and the data storage. The processor is configured to, in response to the at least one sensor detecting a traffic control device and detecting motion of a vehicle during a drive cycle, identify a lane of traffic associated with the vehicle, associate the lane of traffic with the traffic control device, and store the association of the lane of traffic with the traffic control device in the data storage for subsequent access by an automated driving system.

17 Claims, 5 Drawing Sheets

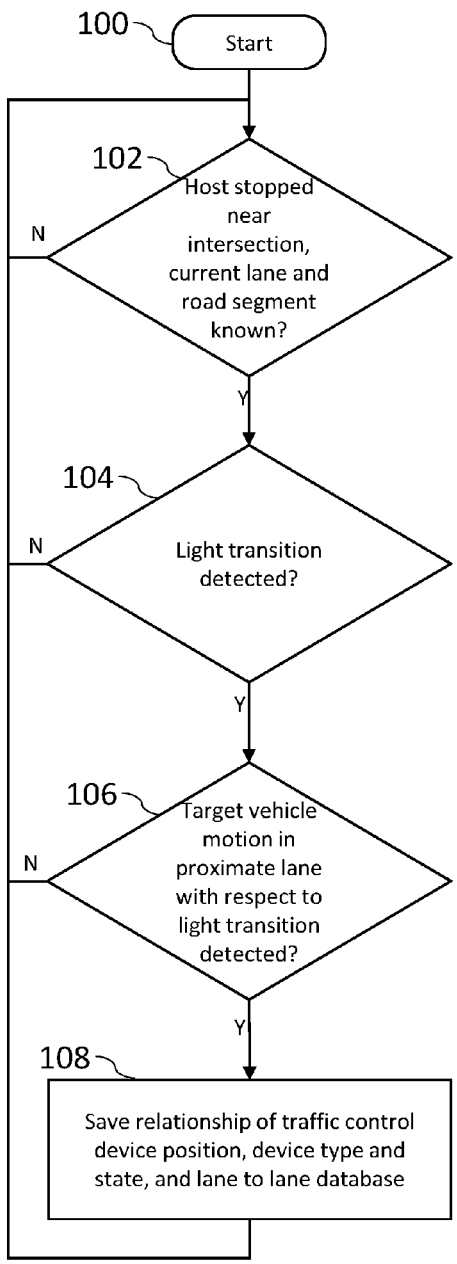
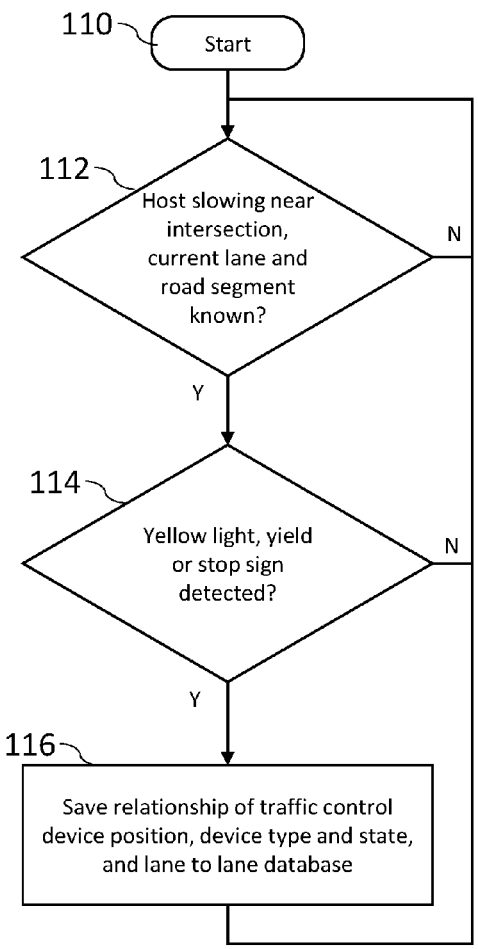
Fig. 6
Fig. 7

SENSOR-BASED ASSOCIATION OF TRAFFIC CONTROL DEVICES TO TRAFFIC LANES FOR AUTONOMOUS VEHICLE NAVIGATION

TECHNICAL FIELD

The present disclosure relates to autonomous vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

A system for generating mapping data according to the present disclosure includes a host vehicle and at least one sensor coupled to the host vehicle. The sensor is capable of detecting a traffic control device and capable of detecting motion of a vehicle. The system additionally includes non-transient data storage and a processor. The processor is in communication with the sensor and the data storage. The processor is configured to, in response to the at least one sensor detecting a traffic control device and detecting motion of a vehicle during a drive cycle, identify a lane of traffic associated with the vehicle, associate the lane of traffic with the traffic control device, and store the association of the lane of traffic with the traffic control device in the data storage for subsequent access by an automated driving system.

According to at least one embodiment, detecting motion of a vehicle includes detecting motion of the host vehicle.

According to at least one embodiment, the sensor is capable of detecting motion of a target vehicle proximate the host vehicle, and detecting motion of a vehicle includes detecting motion of the target vehicle.

According to at least one embodiment, the host vehicle is an autonomous vehicle comprising an automated driving system. The automated driving system is configured to, during a subsequent drive cycle, access the data storage.

According to at least one embodiment, the processor and data storage are coupled to the host vehicle.

According to at least one embodiment, the non-transient data storage includes a remote data storage. In such embodiments, the system may additionally include a wireless communications system coupled to the vehicle, with the processor being in communication with the sensor or the remote data storage via the wireless communications system.

A method of controlling a vehicle according to the present disclosure includes providing a host vehicle with at least one sensor capable of detecting a traffic control device and capable of detecting motion of a vehicle. The method additionally includes, in response to detecting a traffic control device and detecting motion of a vehicle during a drive cycle, identifying a lane of traffic associated with the vehicle and associating the lane of traffic with the traffic control device. The method further includes storing the association of the lane of traffic with the traffic control device in non-transient data storage.

According to at least one embodiment, detecting motion of a vehicle includes detecting motion of the host vehicle.

According to at least one embodiment, the sensor is capable of detecting motion of a target vehicle proximate the host vehicle, and detecting motion of a vehicle includes detecting motion of the target vehicle.

According to at least one embodiment, the method additionally includes accessing, by an automated driving system of an autonomous vehicle, the non-transient data storage. The autonomous vehicle may be the host vehicle.

According to at least one embodiment, the non-transient data storage is remote from the vehicle.

According to various embodiments, the associating is performed by at least one processor associated with the host vehicle or by a server remote from the host vehicle.

An autonomous vehicle according to the present disclosure includes an automated driving system configured to control vehicle steering, acceleration, and braking during a drive cycle. The vehicle additionally includes at least one sensor capable of detecting a traffic control device and capable of detecting motion of a vehicle. The vehicle further includes non-transient data storage and at least one processor. The processor is in communication with the sensor and the data storage. The processor is configured to, in response to the at least one sensor detecting a traffic control device and detecting motion of a vehicle during a drive cycle, identify a lane of traffic associated with the vehicle, associate the lane of traffic with the traffic control device, and store the association of the lane of traffic with the traffic control device in the data storage for subsequent access by the automated driving system.

According to at least one embodiment, the sensor is capable of detecting motion of a target vehicle, distinct from the autonomous vehicle.

According to at least one embodiment, the vehicle additionally includes a wireless communication device. The processor is further configured to communicate the association of the lane of traffic with the traffic control device to a remote server for subsequent access by an additional automated driving system. The processor may be further configured to receive additional associations of additional lanes of traffic with additional traffic control devices from the remote server.

Embodiments according to the present disclosure provide a number of advantages. For example, systems and methods according to the present disclosure may enable faster and less expensive mapping of intersections for navigability by autonomous vehicles.

The above advantage and other advantages and features of the present disclosure will be apparent from the following detailed description of the preferred embodiments when taken in connection with the accompanying drawings.

BRIEF DESCRIPTION OF THE DRAWINGS

FIG. 6 is a flowchart representation of a fourth embodiment of a method for controlling a vehicle according to the present disclosure; and FIG. 7 is a flowchart representation of a fifth embodiment of a method for controlling a vehicle according to the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
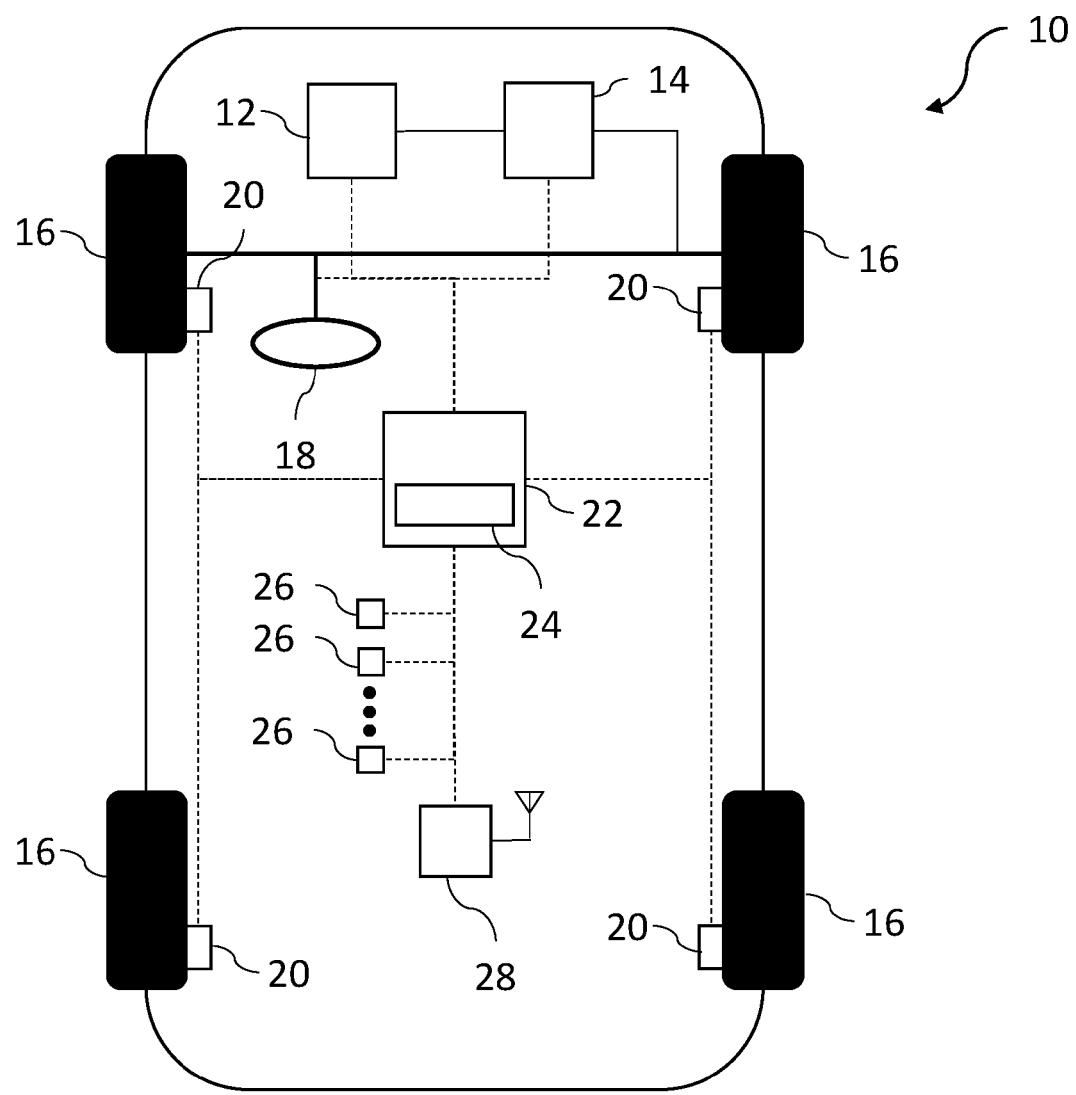
FIG. 1 is a schematic representation of a vehicle according to the present disclosure.

Referring now to FIG. 1, an automotive vehicle 10 according to the present disclosure is shown in schematic form. The automotive vehicle 10 includes a propulsion system 12, which may in various embodiments include an internal combustion engine, an electric machine such as a traction motor, and/or a fuel cell propulsion system.

The automotive vehicle 10 also includes a transmission 14 configured to transmit power from the propulsion system 12 to vehicle wheels 16 according to selectable speed ratios. According to various embodiments, the transmission 14 may include a step-ratio automatic transmission, a continuously-variable transmission, or other appropriate transmission.

The automotive vehicle 10 additionally includes a steering system 18. While depicted as including a steering wheel for illustrative purposes, in some embodiments contemplated within the scope of the present disclosure, the steering system 18 may not include a steering wheel.

The automotive vehicle 10 additionally includes a plurality of vehicle wheels 16 and associated wheel brakes 20 configured to provide braking torque to the vehicle wheels 16. The wheel brakes 20 may, in various embodiments, include friction brakes, a regenerative braking system such as an electric machine, and/or other appropriate braking systems.

The propulsion system 12, transmission 14, steering system 18, and wheel brakes 20 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 is provided with an automated driving system (ADS) 24 for automatically controlling various actuators in the vehicle 10. In an exemplary embodiment, the ADS 24 is configured to control the propulsion system 12, transmission 14, steering system 18, and wheel brakes 20 to control vehicle acceleration, steering, and braking, respectively, without human intervention.

The ADS 24 is configured to control the propulsion system 12, transmission 14, steering system 18, and wheel brakes 20 in response to inputs from a plurality of sensors 26, which may include GPS, RADAR, LIDAR, optical cameras, thermal cameras, ultrasonic sensors, accelerometers, and/or additional sensors as appropriate.

The vehicle 10 additionally includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, additional or alternate wireless communications standards, such as IEEE 802.11 and cellular data communication, are also considered within the scope of the present disclosure.

In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

Figure 2:
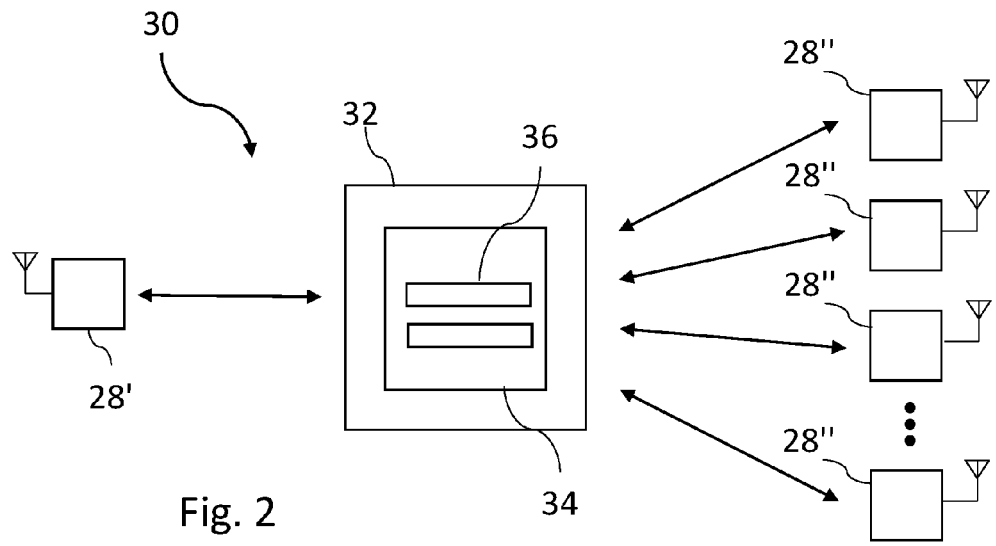
FIG. 2 is a schematic representation of a system for controlling a vehicle according to the present disclosure.

Referring now to FIG. 2, an embodiment of a system 30 for controlling a vehicle is shown. The system 30 includes a wireless communication device 28'. In an exemplary embodiment, the wireless communication device 28' is associated with an autonomous vehicle arranged generally similar to the vehicle 10 as shown in FIG. 1 and discussed above.

The wireless communication device 28' is in communication with at least one remote server 32. In an exemplary embodiment, the wireless communication device 28' is configured to wirelessly communicate with the server 32, e.g. via cellular data communication or other appropriate wireless communication protocols.

The wireless communication device 28" is configured to communicate information to the server 32. The server 32 includes at least one computer readable storage device 34. The server 32 may include a microprocessor or central processing unit (CPU) in communication with the computer readable storage device 34. The computer readable storage device 34 is provided with data 36, e.g. in the form of one or more databases, including a traffic control device database having a list of known traffic control devices and associated intersection positions.

A plurality of additional wireless communication devices 28" are also in communication with the server 32. The additional wireless communication devices 28" are configured to receive information from the server 32, e.g. by accessing the databases 36 or by having information "pushed" from the server 32 to the additional wireless communication devices 28". In an exemplary embodiment, the plurality of additional wireless communication devices 28" are coupled to a plurality of additional vehicles.

In an exemplary embodiment, the ADS 24 is capable of processing inputs from the sensors 26 to identify proximate traffic control devices. Traffic control devices include, but are not limited to, stop signs, stop lights, yield signs, directional signs, and regulatory signs. The ADS 24 may, for example, process an image obtained from an optical camera to identify upcoming traffic lights.

In some intersections, e.g. intersections having a large number of lanes and/or intersections positioned at curves in roads, it may be challenging for known autonomous driving systems to ascertain which traffic control device or devices to obey, e.g. which traffic control devices are associated with a current lane of traffic for the vehicle under ADS control. At such intersections, a known ADS may observe a traffic control device, e.g. a change in color of a traffic light, but have difficulty determining whether to obey the traffic control device based on the current lane of the vehicle absent additional information.

A current method of providing an ADS with additional information regarding an intersection includes human annotation of the intersection. According to these known annotation methods, a human observer will note locations of traffic control devices in an intersection along with any applicable light timing. The location and timing information is stored in a database, and subsequently distributed to an ADS. This process typically takes 5-10 minutes per intersection. As a result, annotating a large number of intersections may be time-consuming and expensive.

Figure 3:
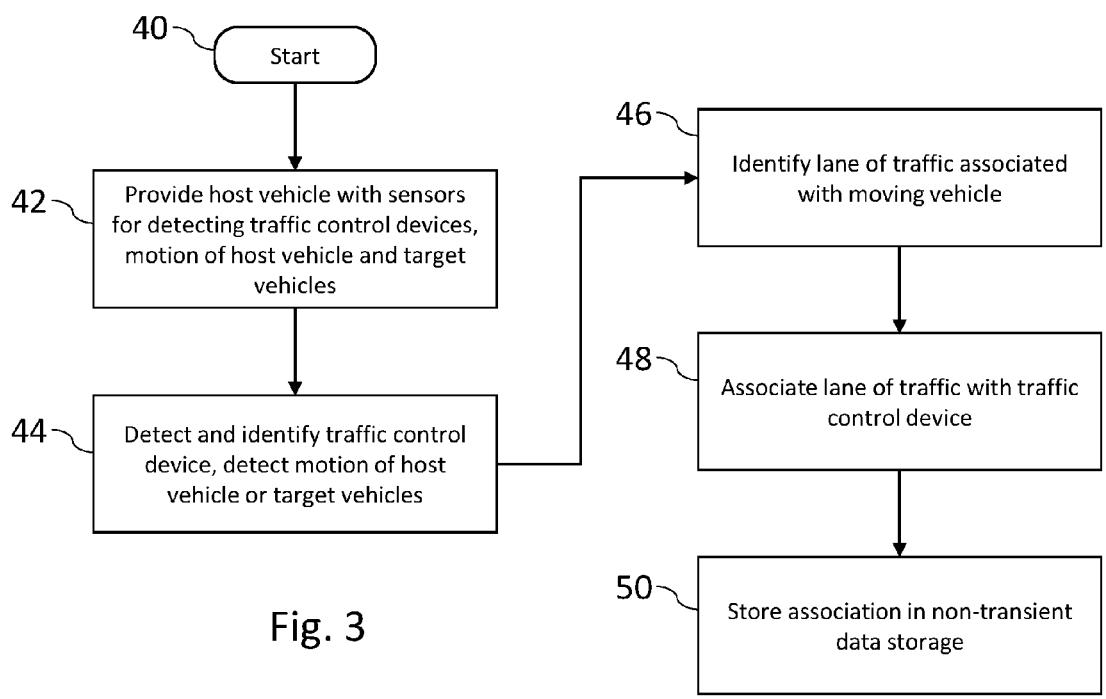
FIG. 3 is a flowchart representation of a first embodiment of a method for controlling a vehicle according to the present disclosure.

Referring now to FIG. 3, a method of controlling a vehicle according to the present disclosure is illustrated in flowchart form. The method begins at block 40.

A host vehicle is provided with sensors for detecting traffic control devices and for detecting motion of the host vehicle and target vehicles in the proximity of the host vehicle, as illustrated at block 42. Examples of such sensors are discussed above with respect to FIG. 1. In an exemplary embodiment the host vehicle is an autonomous vehicle configured generally similarly to that illustrated in FIG. 1. However, in other embodiments, the host vehicle may be, for example, a human-controlled vehicle, i.e. not under ADS control, provided with such sensors.

A traffic control device is detected by the sensors and identified, as illustrated at block 44. In addition, motion of target vehicles proximate the host vehicle and/or motion of the host vehicle is detected, as also illustrated at block 44. The detection and identification may be performed in various ways as appreciated by one of ordinary skill in the art.

A lane of traffic associated with the moving vehicle is identified, as illustrated at block 46. As examples, if motion of the host vehicle was detected in block 44, then the lane of traffic may be associated with a current lane of the host vehicle, while if motion of a target vehicle was detected in block 44, then the lane of traffic may be associated with the target vehicle. According to various embodiments, the identification may be performed onboard the host vehicle, e.g. by the ADS 24, or remotely, e.g. by the server 32. An exemplary embodiment of lane identification will be discussed below with respect to FIG. 4.

The lane of traffic identified in block 46 is then associated with the traffic control device, as illustrated in block 48. According to various embodiments, the association may be performed onboard the host vehicle, e.g. by the ADS 24, or remotely, e.g. by the server 32. Exemplary embodiments of this association will be discussed below with respect to FIGS. 5-7.

The association of traffic lane with traffic control device is then stored in non-transient data storage, as illustrated in block 50. According to various embodiments, the data storage may be local to the vehicle, e.g. associated with the controller 22, or remote, e.g. the storage device 34 associated with the server 32.

As may be seen, a vehicle 10 according to the present disclosure having an ADS 24 may associate traffic lanes with traffic control devices in response to detected vehicle motion. The ADS 24 may subsequently access the stored association to determine whether to obey an observed traffic control device based on the current lane of the vehicle. Moreover, the association may be communicated to the server 32 and stored in the storage device 34 for subsequent access by other vehicles having other ADS systems. Furthermore, vehicles not under ADS control may also associate traffic lanes with traffic control devices and communicate the association to the server 32. Thus, traffic control devices for intersections may be mapped automatically without requiring human annotation.

Figure 4:
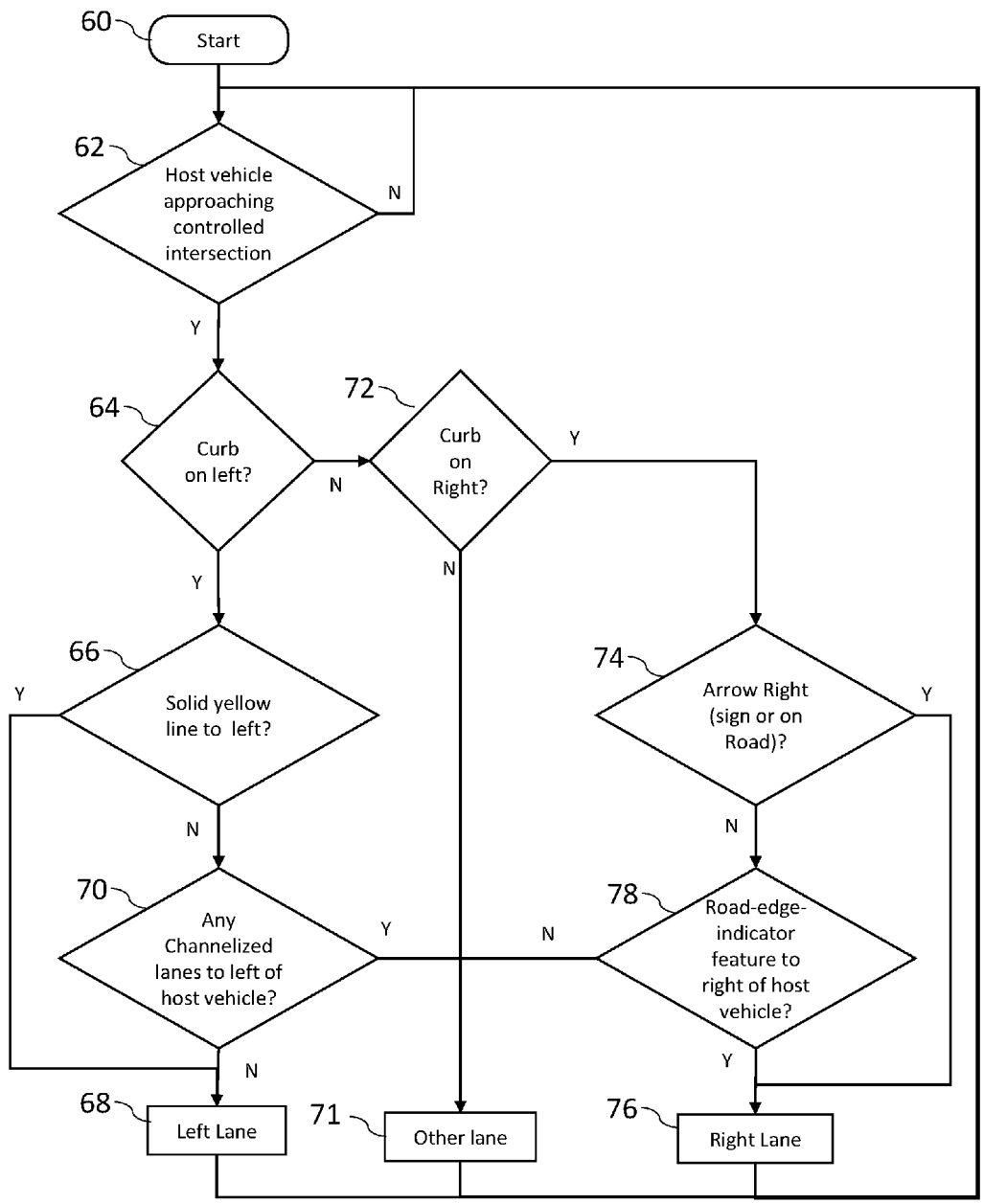
FIG. 4 is a flowchart representation of a second embodiment of a method for controlling a vehicle according to the present disclosure.

Referring now to FIG. 4, a second embodiment of a method for controlling a vehicle according to the present disclosure is illustrated in flowchart form. The method begins at block 60.

A determination is made of whether the vehicle is approaching a controlled intersection, as illustrated at operation 62. A controlled intersection refers to an intersection of two roads having at least one traffic control device for providing instructions to vehicles on the roads.

If the determination of operation 62 is negative, control returns to operation 62. Thus, the algorithm does not proceed unless and until the host vehicle approaches a controlled intersection.

If the determination of operation 62 is positive, a determination is made of whether a curb, e.g. a raised interface between the road and a median or sidewalk, is positioned to the immediate left side of the host vehicle, e.g. with no additional lanes therebetween, as illustrated at operation 64. In this embodiment, left is used to indicate a driver's side of the vehicle in a so-called right-hand-drive jurisdiction. However, in some embodiments, e.g. as may be used in so-called left-hand-drive jurisdictions, the directions may be other than those specifically discussed in these embodiments.

If the determination of operation 64 is positive, a determination is made of whether a solid yellow lane divider line, e.g. as is generally used to divide opposing lanes of traffic or to indicate a road boundary, is positioned to the immediate left side of the vehicle, as illustrated at operation 66.

If the determination of operation 66 is positive, the current lane for the host vehicle may be identified as a left lane, as illustrated at block 68. In an exemplary embodiment, the current lane may be identified as a left-most lane for a current road segment. Control then returns to operation 62.

If the determination of operation 66 is negative, a determination is made of whether any channelized lanes are positioned to the left side of the vehicle, as illustrated at operation 70. Channelized lanes refer to parallel lanes of traffic flow or lanes that are not opening, merging, or ending. Channelized lanes may in some cases be separated from the rest of the intersection by painted lines or raised barriers.

If the determination of operation 70 is positive, i.e. channelized lanes are detected to the left of the host vehicle, then the current lane may be identified as "other", e.g. neither a left-most lane nor a right-most lane, as illustrated at block 71. Such lanes may be referred to as center lanes. In an exemplary embodiment, if multiple center lanes are detected, a current lane may be estimated based on, e.g., a relative distance between a curb detected to the left of the vehicle and a curb detected to the right of the vehicle. Control then returns to operation 62

If the determinations of operation 70 is negative, i.e. no channelized lanes are detected to the left of the host vehicle, then control proceeds to block 68, and the current lane for the host vehicle is identified as the left lane.

Returning to operation 64, if the determination is negative, then a determination is made of whether a curb is positioned to the immediate right side of the vehicle, as illustrated at operation 72.

If the determination of operation 72 is negative, e.g. no curb is identified on the left or right of the vehicle, control proceeds to block 71 and the lane is identified as "other" as discussed above. Control then returns to operation 62.

If the determination of operation 72 is positive, a determination is made of whether a right turn arrow traffic indicator is detected for the current lane of traffic, e.g. on a sign or on the road, as illustrated at operation 74.

If the determination of operation 74 is positive, i.e. a right turn arrow traffic indicator is detected, then the current lane for the host vehicle may be identified as a right lane, as illustrated at block 76. In an exemplary embodiment, the current lane may be identified as a right-most lane for a current road segment. Control then returns to operation 62.

If the determination of operation 74 is negative, a determination is made of whether a road-edge-indicator feature is identified to the immediate right of the host vehicle, as illustrated at operation 78. Road-edge-indicator features include, but are not limited to a detected road edge, a bike lane, or a line of parallel-parked cars.

If the determination of operation 78 is positive, i.e. a road edge indicator feature is detected, then control proceeds to block 76 and the current lane for the host vehicle may be identified as a right lane. Control then returns to operation 62.

If the determination of operation 78 is negative, control proceeds to block 71 and the lane is identified as "other" as discussed above. Control then returns to operation 62.

As will be understood by one of ordinary skill in the art, the determinations of operations 64, 66, 70, 72, 74, and 78 may be made automatically, e.g. by the ADS 24, according to various algorithms based on inputs received from the sensors 26.

As may be seen, embodiments according to the present disclosure provide a method for identifying whether the host vehicle is in a left lane, right lane, or an other lane. As understood by one of ordinary skill in the art, additional road-edge-indicator features may also be evaluated to confirm the presence of the vehicle in a given lane. As will be discussed in further detail below, the identified lane for the host vehicle may be subsequently used for associating detected traffic flows with particular lanes.

Figure 5:
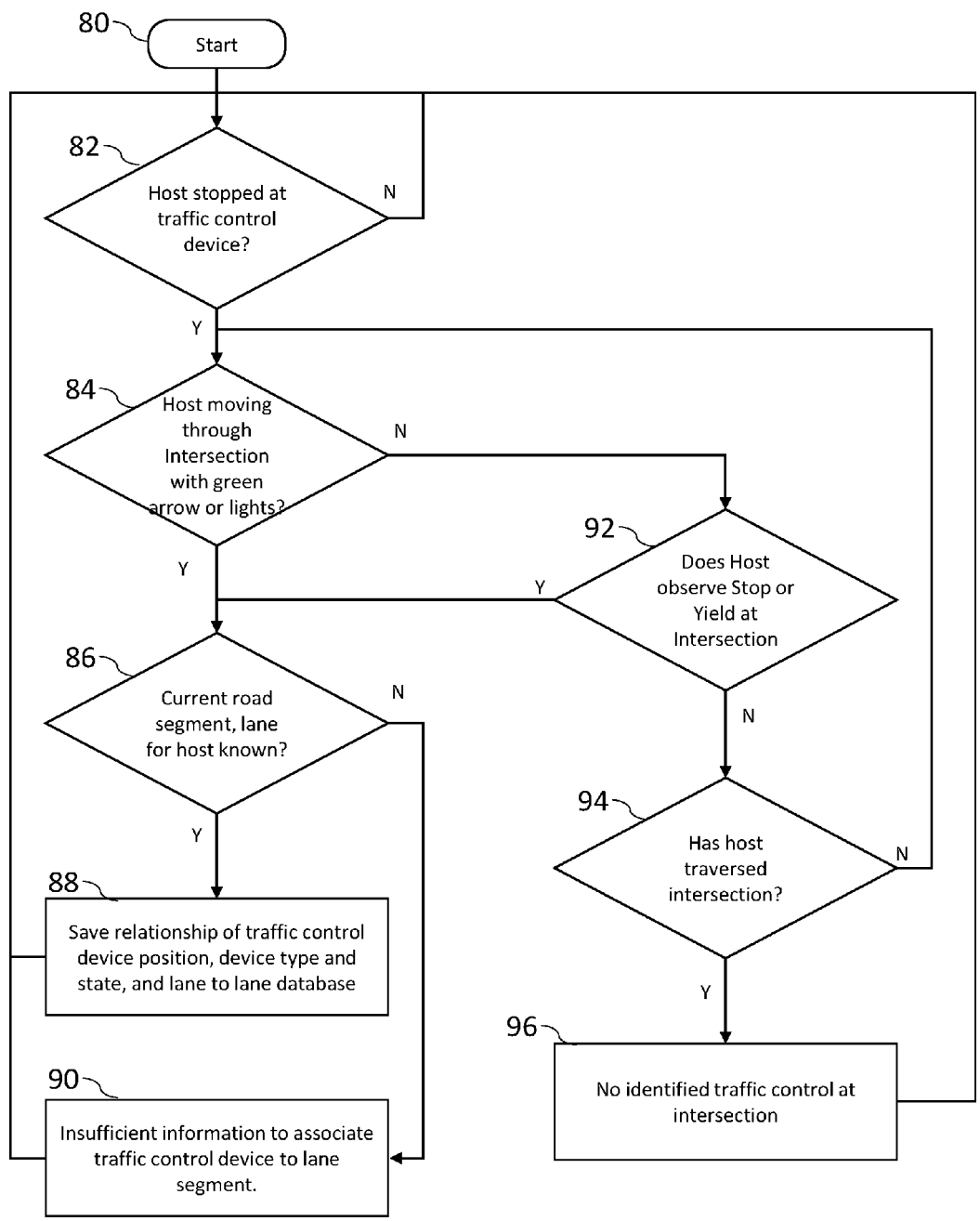
FIG. 5 is a flowchart representation of a third embodiment of a method for controlling a vehicle according to the present disclosure.

Referring now to FIG. 5, a third embodiment of a method for controlling a vehicle according to the present disclosure is illustrated in flowchart form. The method begins at block 80.

A determination is made of whether the host vehicle is stopped at a traffic control device, e.g. one identified as a red turn arrow or red light, as illustrated at operation 82.

If the determination of operation 82 is negative, control returns to operation 82. Thus, the algorithm does not proceed unless and until the host vehicle stops at a traffic control device.

If the determination of operation 82 is positive, a determination is made of whether the host vehicle has begun moving through the intersection with a green arrow or green traffic light identified, as illustrated at operation 84.

If the determination of operation 84 is positive, a determination is made of whether the current road segment and lane for the host vehicle are known, as illustrated at operation 86. The lane information may be obtained, for example, using the algorithm illustrated in FIG. 4. The road segment may be obtained from, for example, navigation system data.

If the determination of operation 86 is positive, then the relationship of traffic control device position, traffic control device type and state, e.g. sign, turn arrow, or solid light, and current lane or trajectory are stored in a database, as illustrated at block 88. According to various embodiments, the data storage may be local to the vehicle, e.g. associated with the controller 22, or remote, e.g. the storage device 34 associated with the server 32. Control then returns to operation 82.

If the determination of operation 86 is negative, then insufficient information is available to associate the traffic control device to a current lane, as illustrated at block 90. However, potential trajectories for the current lane may still be tracked, e.g. a probabilistic determination may be used to predict a traffic control device likely associated to the current lane.

Returning to operation 84, if the determination of operation 84 is negative, i.e. the host vehicle does not move through the intersection while observing a green arrow or light, then a determination is made of whether the host vehicle observes a stop or yield at the intersection, as illustrated at operation 92. Observation of a stop or yield refers to either automated identification of a stop or yield traffic control device, to the host vehicle performing stop or yield behavior, or both. Stop or yield behavior may include, for example, a brief stop and subsequent resumption of vehicle motion.

If the determination of operation 92 is positive, then control proceeds to operation 86 and the association of traffic control device and lane may be stored if adequate information is known, as discussed above.

If the determination of operation 92 is negative, a determination is made of whether the host vehicle has traversed the intersection, as illustrated at operation 94.

If the determination of operation 94 is negative, control returns to operation 84.

If the determination of operation 94 is positive, then no traffic control is identified or recorded for the intersection, as illustrated at block 96. Control returns to operation 82.

Referring now to FIG. 6, a fourth embodiment of a method for controlling a vehicle according to the present disclosure is illustrated in flowchart form. The method begins at block 100.

A determination is made of whether the host vehicle has stopped near an intersection and of whether the current road segment and lane are known, as illustrated at operation 102.

If the determination of operation 102 is positive, a determination is made of whether the host vehicle detects a traffic control device transition, e.g. the host vehicle detecting a traffic light changing from red to green, as illustrated at operation 104.

If the determination of operation 104 is positive, a determination is made of whether the host vehicle detects target vehicle motion in a proximate lane with respect to the traffic control device transition, as illustrated at operation 106. Target vehicle motion with respect to the traffic control device transition refers to, for example, a detected target vehicle proximate the host vehicle transitioning from a stopped state to a moving state subsequent the traffic control device transition, indicating that the target vehicle motion is in response to the traffic control device transition. According to various embodiments, proximate lanes may refer to lanes to the left or to the right of the current host vehicle lane or in cross-traffic with respect to the current host vehicle lane.

If the determination of operation 106 is positive, then the relationship of traffic control device position, traffic control device type and state, e.g. sign, turn arrow, or solid light, and current lane or trajectory are stored in a database, as illustrated at block 108. According to various embodiments, the data storage may be local to the vehicle, e.g. associated with the controller 22, or remote, e.g. the storage device 34 associated with the server 32. Control then returns to operation 102.

If the determinations of operations 102, 104, or 106 are negative, then insufficient information is available to associate the traffic control device to a particular lane and control returns to operation 102.

Referring now to FIG. 7, a fifth embodiment of a method for controlling a vehicle according to the present disclosure is illustrated in flowchart form. The method begins at block 110.

A determination is made of whether the host vehicle is near an intersection, is decelerating, and of whether the current road segment and lane are known, as illustrated at operation 112.

If the determination of operation 112 is positive, a determination is made of whether the host vehicle detects a yellow light, yield light, or stop sign, as illustrated at operation 114.

If the determination of operation 114 is positive, then the relationship of traffic control device position, traffic control device type and state, e.g. sign, turn arrow, or solid light, and current lane or trajectory are stored in a database, as illustrated at block 116. According to various embodiments, the data storage may be local to the vehicle, e.g. associated with the controller 22, or remote, e.g. the storage device 34 associated with the server 32. Control then returns to operation 112.

If the determinations of operations 112 or 114 are negative, then insufficient information is available to associate the traffic control device to a particular lane and control returns to operation 112.

As may be seen, embodiments according to the present disclosure provide a method for identifying and associating traffic control devices based on behavior of both the host vehicle and of detected target vehicles in the vicinity of the host vehicle. This may enable faster and less expensive mapping of intersections for navigability by autonomous vehicles. Moreover, the mapping may be performed based on information from both autonomous vehicles and vehicles not under ADS control.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for generating mapping data comprising:
   a host vehicle;
   at least one sensor coupled to the host vehicle, the at least one sensor being capable of detecting a traffic control device and capable of detecting motion of a vehicle;
   non-transient data storage; and
   a processor in communication with the at least one sensor and the non-transient data storage, the processor being configured to, in response to the at least one sensor detecting a traffic control device and detecting motion of a vehicle during a drive cycle, identify a lane of traffic associated with the vehicle, associate the lane of traffic with the traffic control device, and store mapping data including the association of the lane of traffic with the traffic control device in the non-transient data storage for access by an automated driving system during a subsequent drive cycle.

2. The system of claim 1, wherein detecting motion of a vehicle includes detecting motion of the host vehicle.

3. The system of claim 1, wherein the at least one sensor is capable of detecting motion of a target vehicle proximate the host vehicle, and wherein detecting motion of a vehicle includes detecting motion of the target vehicle.

4. The system of claim 1, wherein the host vehicle is an autonomous vehicle comprising an automated driving system, the automated driving system being configured to, during the subsequent drive cycle, access the non-transient data storage.

5. The system of claim 1, wherein the processor and the non-transient data storage are coupled to the host vehicle.

6. The system of claim 1, wherein the non-transient data storage includes a remote data storage.

7. The system of claim 6, further comprising a wireless communications system coupled to the vehicle, wherein the processor is in communication with the sensor via the wireless communications system.

8. The system of claim 6, further comprising a wireless communications system coupled to the vehicle, wherein the processor is in communication with the remote data storage via the wireless communications system.

9. A method of controlling a vehicle comprising:
   providing a host vehicle with at least one sensor capable of detecting a traffic control device and capable of detecting motion of a vehicle;
   providing a non-transient data storage;
   providing the host vehicle with a processor in communication with the at least one sensor and the non-transient data storage;
   in response to the at least one sensor detecting a traffic control device and detecting motion of a vehicle during a first drive cycle, automatically identifying a lane of traffic associated with the vehicle and associating the lane of traffic with the traffic control device via the processor;
   storing mapping data including the association of the lane of traffic with the traffic control device in the non-transient data storage;
   providing an automated driving system configured to control a propulsion system, a transmission, a steering system, and a wheel brake of an autonomous vehicle; and
   during a second drive cycle subsequent the first drive cycle, accessing, by the automated driving system, the mapping data in the non-transient data storage, and controlling the propulsion system, the transmission, the steering system, and the wheel brake via the automated driving system based on the mapping data.

10. The method of claim 9, wherein detecting motion of a vehicle includes detecting motion of the host vehicle.

11. The method of claim 9, wherein the at least one sensor is capable of detecting motion of a target vehicle proximate the host vehicle, and wherein detecting motion of a vehicle includes detecting motion of the target vehicle.

12. The method of claim 9, wherein the autonomous vehicle is the host vehicle.

13. The method of claim 9, wherein the non-transient data storage is remote from the vehicle.

14. An autonomous vehicle comprising:
   an automated driving system configured to control vehicle steering, acceleration, and braking during a drive cycle;
   at least one sensor capable of detecting a traffic control device and capable of detecting motion of a vehicle;
   non-transient data storage; and
   at least one processor in communication with the at least one sensor and the non-transient data storage, the processor being configured to, in response to the at least one sensor detecting a traffic control device and detecting motion of a vehicle during a drive cycle, identify a lane of traffic associated with the vehicle, associate the lane of traffic with the traffic control device, and store mapping data including the association of the lane of traffic with the traffic control device in the non-transient data storage for access by the automated driving system during a subsequent drive cycle.

15. The autonomous vehicle of claim 14, wherein the at least one sensor is capable of detecting motion of a target vehicle, distinct from the autonomous vehicle.

16. The autonomous vehicle of claim 14, further comprising a wireless communication device, wherein the at least one processor is further configured to communicate the association of the lane of traffic with the traffic control device to a remote server for subsequent access by an additional automated driving system.

17. The autonomous vehicle of claim 16, wherein the at least one processor is further configured to receive additional associations of additional lanes of traffic with additional traffic control devices from the remote server.

* * * * *